United States Patent Office 3,096,021
Patented July 2, 1963

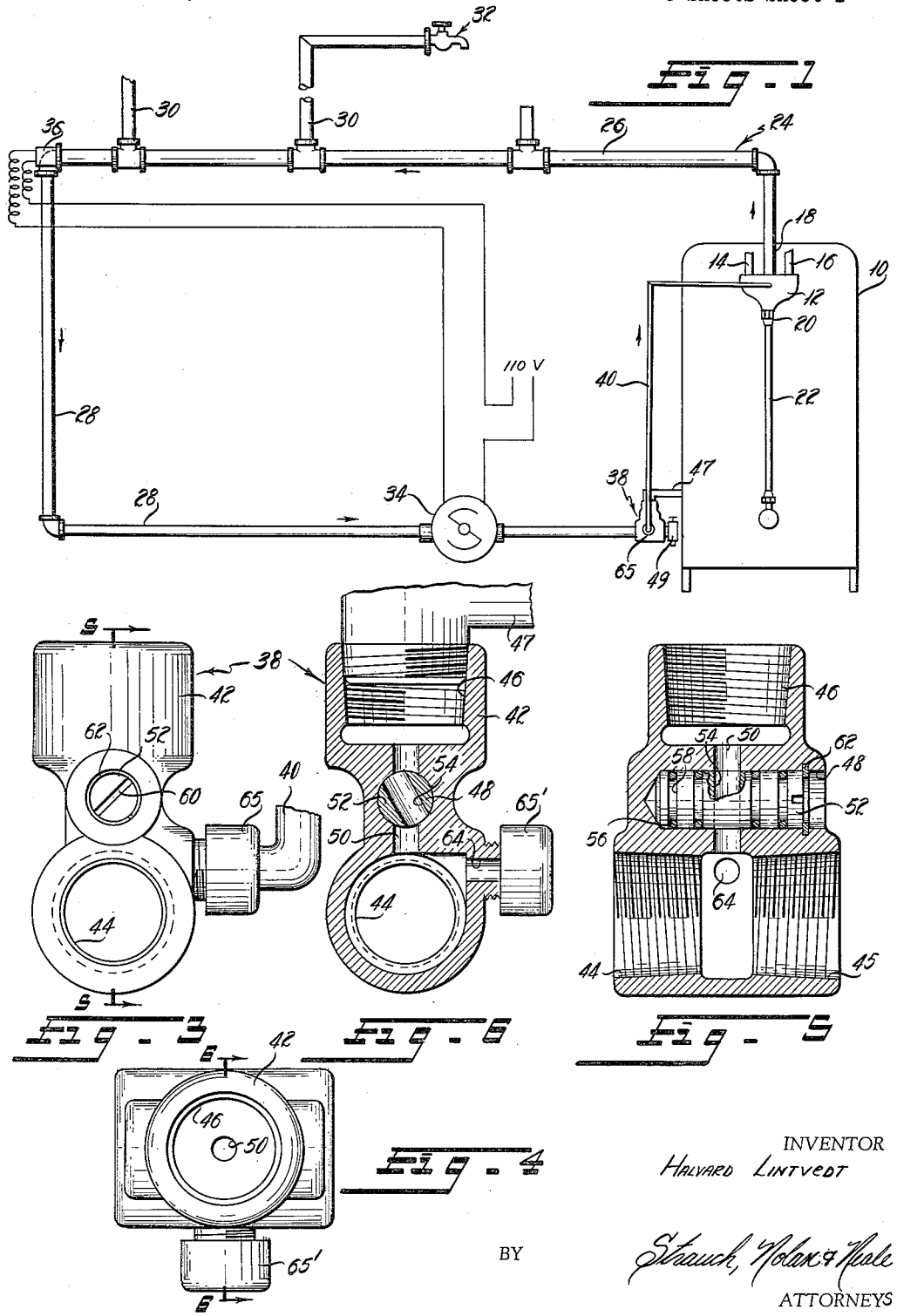

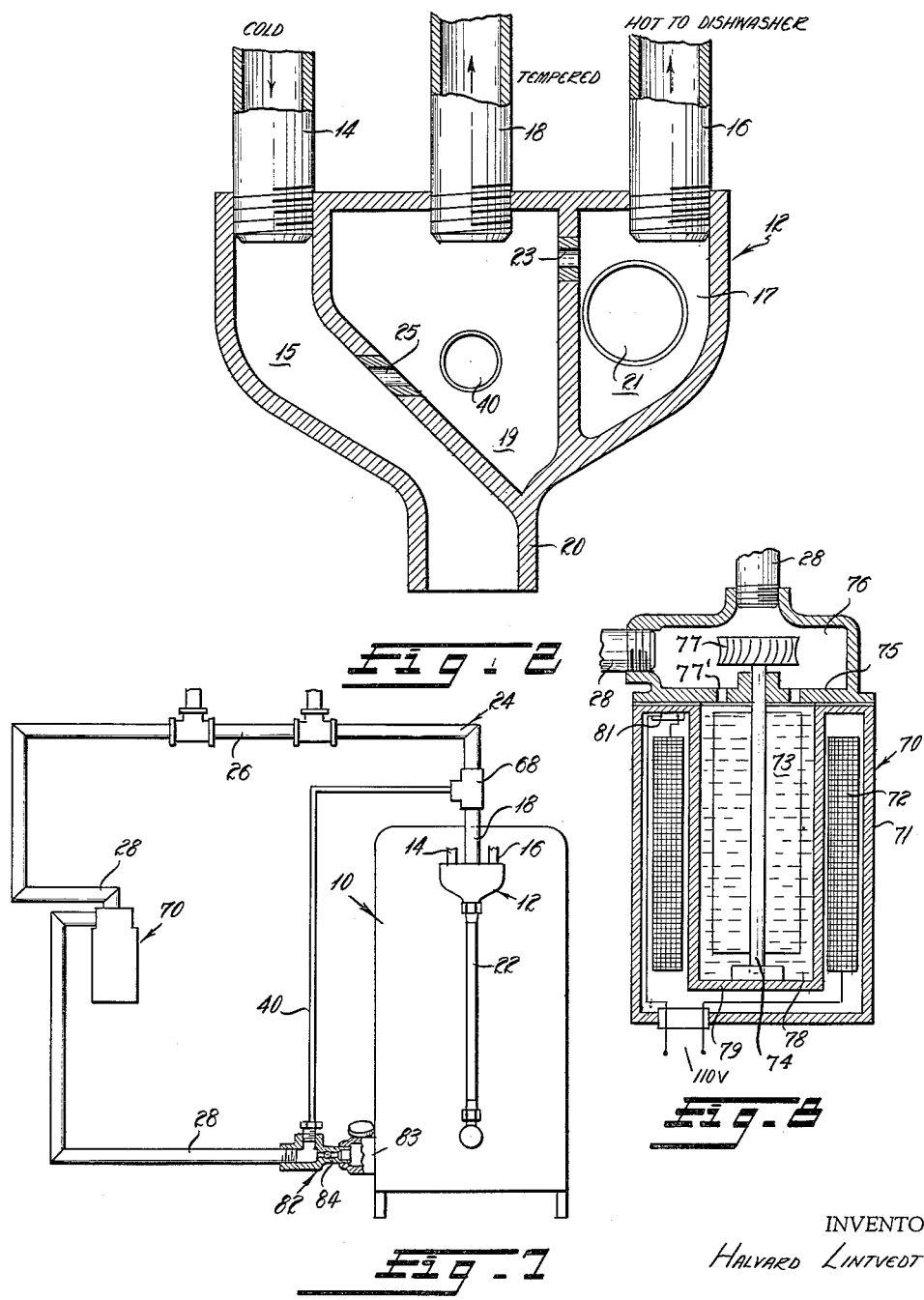

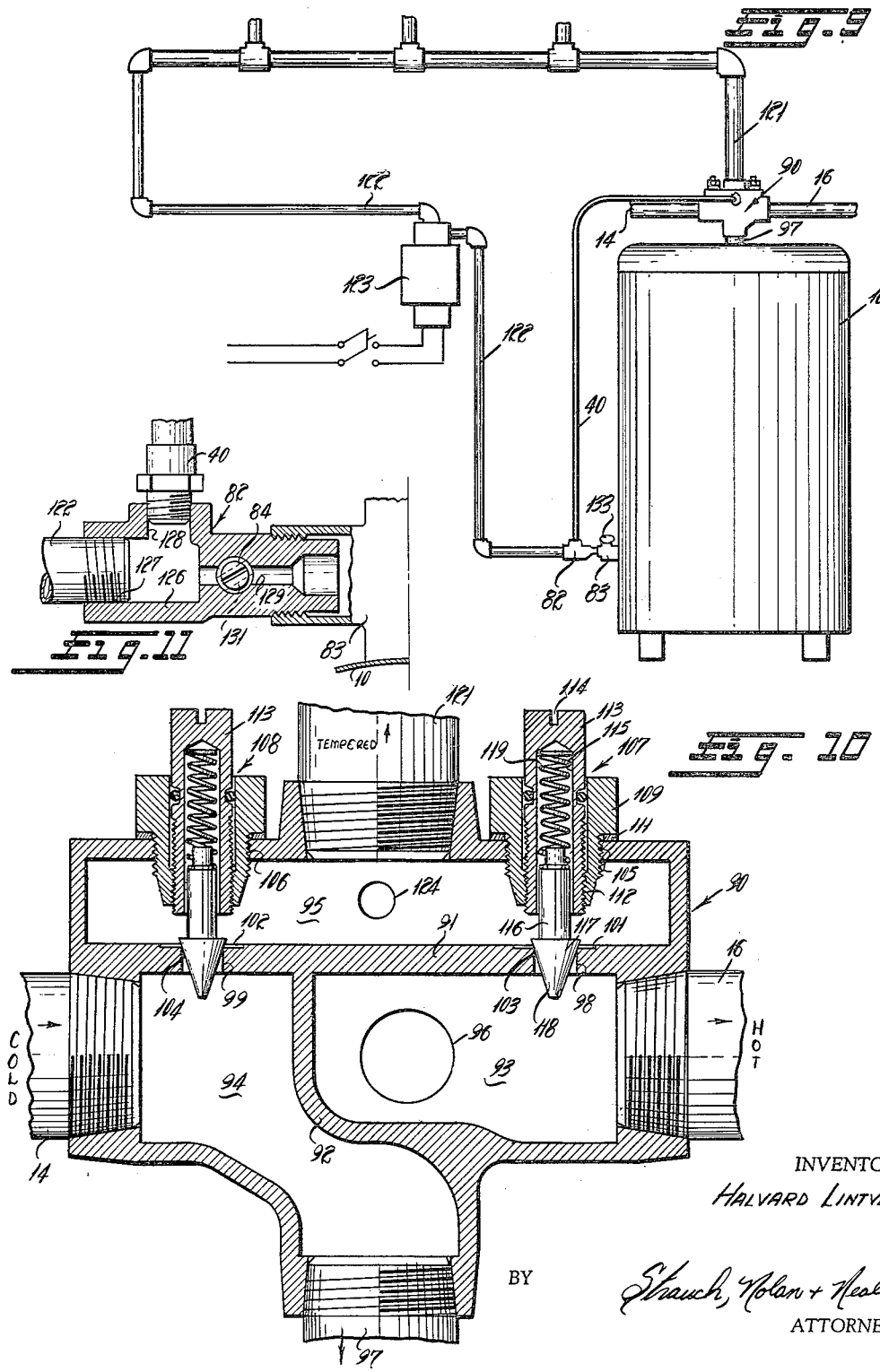

3,096,021
HOT WATER CIRCULATING SYSTEM
Halvard Lintvedt, Kalamazoo, Mich., assignor to Ruud Manufacturing Company, Kalamazoo, Mich., a corporation of Delaware
Filed Dec. 17, 1958, Ser. No. 780,971
4 Claims. (Cl. 236—20)

This invention relates to hot water supply systems and more particularly is concerned with an improved apparatus for providing withdrawal of hot water from a storage reservoir or the like at a suitable intermediate temperature.

In hot water systems, water at two different temperatures often is required. For example, water service for automatic dishwashing and laundering machines usually is desired at 180° F., whereas service for lavatories and baths is desired within a temperature range of 120°–140° F. to prevent injury to the user by scalding and to obviate excessive heat loss in long pipe runs. For this latter purpose, therefore, water is usually heated to 180° F at a suitable reservoir and subsequently mixed with cooler water as to provide a second source of water having a temperature of 140° F.

Systems have been proposed that employed various types of mixing valves in the past to facilitate the desired lowering of water temperature. These valves generally function to admit cold water for mixing as the tempered hot water is withdrawn through the service fixture. In conjunction with mixing apparatus, some systems provide for a supply line only, omitting a recirculating or return arrangement. Systems of this type also may employ relatively complicated thermostatic valves to stop flow into the supply line when no water is being withdrawn and, consequently, no mixing is occurring. Thus, water in the supply line rapidly cools off and when the tap is again turned on, it first is required to evacuate the cooled water before properly tempered water reaches the point of usage.

To obviate this condition, some systems incorporate a recirculating line to reheat the water in the supply. Upon termination of water withdrawal, however, these prior systems operate to continue to heat the water recirculated through the heater or boiler to a heater temperature of 180° F. Thus, the temperature of the water in the service fixture supply line may undesirably be raised to this higher temperature level. When water again is withdrawn for usage the recirculated amount in the supply line now approaching 180° F. will initially pass through the tap before properly tempered water is available to fill the pipe. This condition is contributory to the hazards of scalding and also results in excessive heat loss.

According to the present invention, a special mixing valve is disposed in the hot water return line between the heating tank and points of usage providing for a source of untempered hot water and a source of tempered hot water. Tempered hot water, in addition to being delivered to a point of usage is recirculated partly through the heating tank and partly through a by-pass line such that only a part of the recirculated water is reheated, and overheating of the tempered water is prevented.

Accordingly, with the foregoing considerations in mind, it is the major object of this invention to provide a novel hot water system for supplying untempered hot water and tempered hot water from a single source while maintaining the supply of tempered hot water at substantially a constant temperature irrespective of usage.

It further is the object of this invention to provide in a novel hot water system a valve and heating tank by-pass arrangement whereby a supply line water temperature is maintained constant at a predetermined value.

It further is the object of this invention to provide a novel hot water system of relatively simplified construction.

Further objects of the invention will presently appear as the description proceeds in connection with the appended claims and the annexed drawings wherein:

FIGURE 1 is a schematic representation of a hot water supply system according to the preferred embodiment of the invention;

FIGURE 2 is a schematic section of a mixing valve on the tank unit;

FIGURE 3 is an end elevation of the by-pass valve shown in FIGURE 1;

FIGURE 4 is a top view of the by-pass valve shown in FIGURE 3;

FIGURE 5 is a section substantially along lines 5—5 of FIGURE 3;

FIGURE 6 is a section substantially along lines 6—6 of FIGURE 4;

FIGURE 7 is a schematic representation in part showing another form of the invention;

FIGURE 8 diagrammatically illustrates one form of thermal switch and pump control assembly;

FIGURE 9 illustrates a system according to a further embodiment employing check valves in the mixing unit;

FIGURE 10 is an enlarged section showing the internal structure of a mixing fitting; and FIGURE 11 is a fragmentary view partially in section showing the connection of the system into the tank.

Referring first to FIGURE 1, 10 designates a vertical upstanding hot water storage tank unit of a generally conventional structure. Connected to the storage tank at the upper end thereof is a mixing valve 12 wherein part of the hot water from the tank unit is admixed with cool water to produce a tempered water supply less hot than the tank water.

The mixing valve 12 as shown in FIGURE 2 has a cold water inlet 14, an untempered hot water outlet 16, a tempered hot water outlet 18 and a cold water outlet 20. The cold water outlet is suitably coupled to a riser 22 which is connected to discharge into the lower portion of the storage tank 10 for supplying make-up water to the system. The cold water inlet 14 is suitably connected to a cold water reservoir (not shown) and provides water for mixing and replacement of withdrawn tank water. The untempered hot water outlet is arranged to be connected to a point of usage (not shown) where water at the high storage tank temperature is desired.

As shown in FIGURE 2, valve 12 internally is divided into a cold water chamber 15, a hot water chamber 17 and a tempered water chamber 19. The hot water chamber 17 is connected directly into the top of tank 10 by a short conduit indicated at 21 so that water from the hottest part of the tank water body, usually about 180°, is delivered into chamber 17. Cold water from chamber 15 and hot water from chamber 17 are introduced into chamber 19 through proportional valves 23 and 25 respectively that meter the amounts of tank and cold water needed to provide tempered hot water for conduit 18, usually at about 120° F. to 140° F.

The tempered hot water outlet 18 is suitably connected to a circulating pipeline 24 comprising a supply line portion 26 and a return line portion 28. Connected to the supply line 26 are branch pipes 30 which communicate with points of usage such as service fixtures 32.

The return line 28 is connected to discharge into the lower portion of the storage tank unit. Disposed in the return line is a circulating pump 34 having a thermostatic control element 36 in the pipeline and a flow regulating valve 38. A bypass conduit 40 establishes a connection between the regulating valve 38 and the tempered hot water supply outlet 18 of valve 12 and FIGURE 2 indicates bypass conduit 40 as connected into chamber 19.

Referring now to FIGURES 3–6, regulating valve 38 comprises a metal valve body 42, a longitudinal unrestricted flow passage 44 having both ends internally threaded, an internally threaded outlet 46 at right angles to passage 44 and a valve receiving bore 48 extending parallel to the axis of passage 44.

A rotatable elongated cylindrical valve member 52 is arranged to be snugly and rotatably received in bore 48 to control the flow of returned water through passageway 50. A central passage 54 is formed in valve member 52 transversely of its longitudinal axis and, upon rotation of the member, may be adjustably aligned with passageway 50 to proportionately control flow from the return line into the bypass and the tank as will appear. Passage 54 is of about the same size as passageway 50 so that in one position of valve member 52 it provides unobstructed flow through passage 50. In another position valve member 52 blocks passage 50. The external exposed head of the valve member 52 is formed with a transverse groove 60 to permit rotation thereof with a suitable implement such as a screw driver. A spring snap ring 62 fitting in an annular groove in bore 48 secures the valve member 52 in the bore against axial movement. Sealing O-rings 56 compressed in annular grooves 58 on valve member 52 seal the periphery of the member fluid tight with bore 48.

The valve body 42 further is formed with a side passageway 64 communicating with passage 44 and (see FIGURE 3) connected to bypass conduit 40 by a fitting 65. Passage 64 is always open and its reduced size creates a back pressure sufficient to force water through passage 54 at a desired rate.

The system return line 28 is threadedly connected directly into the left or inlet end of passage 44. A conduit 47 connects outlet 46 of valve 38 into the tank. The outlet side 45 of passage 44 is connected to a drain fitting and valve assembly 49. Thus, it is apparent that rotation of the valve member 52 varies the relative amounts of water directed through the bypass and recirculated to the storage tank to be reheated.

When, as in commercial installations, the water in the line 26 is desired at highest temperature, bypass line 40 is omitted and a cap 65' is placed on the end of passage 64.

In operation, the hot water storage unit is fired in the conventional manner to heat the water therein to a predetermined temperature, normally 180° F. This may comprise any suitable gas burner or electrical heater which may operate either continuously or intermittently in the lower part of the tank controlled by a thermostat located in the water near the top of the tank. Untempered hot water at 180° F. will then be available at the outlet 16 of mixing valve 12 and tempered water at about 140° F. will flow from the mixing valve into the circulating pipeline 24 at least until that line is filled. As tempered water is used it is replaced in supply line 26 by direct flow from chamber 19. As tempered water is withdrawn through the service fixture 32 cold water make-up in an amount equal to the withdrawn hot water enters the unit 10 through the mixing valve 12 and riser 22.

When water is being fairly continuously withdrawn from supply line 26 the tempered water temperature is reasonably maintained, but when water is not being taken out of pipes 30 for any length of time the water in line 26 will tend to cool due to radiation losses. The return line 28 is provided to circulate water from the supply line 26 back into the tank so that water at the temperature of chamber 19 will always be available in line 26, pump 34 being provided to induce circulation.

Should return line 28 be connected directly into the bottom of tank 10 and such circulation of water in line 24 continue over a long period without withdrawal of any tempered hot water at 30, the temperature of the water in supply line 26, in fact very probably in the entire line 24, will gradually rise because no cold water from line 14 is being supplied to mixing valve 12 and only hot water is being drawn into chamber 19. Thus after a period of non-use the water available at the faucet connected to line 30 may be at the dangerous scalding 180° F. temperature.

The invention prevents this through the action of regulating valve 38 and the bypass 40. Preferably thermostat 36 is located at the furthest portion of supply line 26 so as to be responsive to the coolest water in line 26. Pump 34 is normally inoperative so that there is no flow in line 24 except when the thermostat 36 demands hotter water in line 26. Should the temperature of the water in line 26 fall below a predetermined value, as due to radiation losses (say below 140° F.), the thermostatic element 36 responds to start the pump 34 for causing a forced circulation of water through the pipeline 24. The returned water is divided between bypass 40 and the storage tank unit 10 by regulating valve 38.

The regulating valve 38 is adjusted, as previously described, to deliver first a measured amount of the cooled return water into the storage tank to be reheated. The remaining second measured amount of the returned water flows through the bypass 40 into the chamber 19 to mix with the tempered water being withdrawn from the mixing valve. At the same time hot water at 180° equal in amount to the first measured amount is introduced into chamber 19. In this manner, the system may be thermodynamically balanced when no water is being withdrawn for usage. Valve 38 may be set to deliver only that amount of water to the unit 10 which, upon effective reheat, will absorb an additional heat content equivalent to the pipe and other heat losses in the system. Thus, the heat added to the closed system, not being in excess of the heat losses, will cause the temperature of the water in line 24 to remain constant and at a desired safe temperate level. Thermostat 36 shuts off the pump and therefore stops circulation in line 24 when the temperature for line 26 is attained.

In the embodiment illustrated in FIGURE 7, the bypass conduit 40 is connected at 68 to introduce the diverted amounts of return water into the supply line 26 downstream and substantially adjacent the tempered water outlet 18 of the mixing valve 12. In this manner, the connection of the bypass is accomplished to the exclusion of the mixing valve thereby obviating the necessity of providing for a special inlet port in the shell of the latter to receive the diverted amounts of return water. Thus, the mixing valve may readily by interchanged with other systems not employing a bypass conduit without requiring any modification of its components.

FIGURE 7 also illustrates the use of an electric water circulating pump assembly 70 having a built-in control switch that is responsive to temperature of the return line tempered water.

FIGURE 8 shows the internal structure of this pump assembly wherein the motor housing 71 is rigidly mounted on a suitable stationary support and encloses the field coils 72 and rotor 73. The rotor shaft 74 extends through an internal wall 75 into upper chamber 76 where the shaft has mounted on it the pump impeller 77.

Wall 75 has a series of apertures 77' so that the water of chamber 76 may enter a normally water filled chamber 78 defined by a suitable casing 79 surrounding and supporting the rotor. This cools the motor and lubricates rotor 74.

The motor field coils are in electrical circuit with a control switch indicated at 81. Switch 81 is an aquastat of more or less conventional construction that has a thermal element either applied to wall 75 or probing into chamber 76, in any event so as to be sensitive to the water temperature of chamber 76. Switch 81 is usually set to be closed at a selected low limit temperature (such as 125°

F.) and be opened at a selected high limit temperature (such as 140° F.), automatically.

The motor is cooled and lubricated by the water in chamber 78, and the motor is operated only when chambers 76 and 78 are full of water, this water being at the return water temperature.

As also shown in FIGURE 7 the return line 28 enters a flow control regulating valve 82 of slightly different form that in turn is connected through drain valve fitting 83 to the heater tank. Rotation of plug 84 proportions the flow to the bypass line 40 and the tank as in the earlier embodiment.

The operation of the system as illustrated in FIGURE 7 is substantially the same as that previously described. The storage tank unit 10 supplies untempered hot water to the mixing valve 12 and there it is mixed with cold water to a predetermined intermediate temperature and discharged into the supply line 26. The thermostatically controlled pump assembly 70 circulates the water through the supply and return lines, the storage tank unit and the bypass conduit in the manner previously described. The measured amount of water diverted by the regulating valve 38 or 82 to the bypass conduit and passed therethrough is then introduced directly into the supply line 26 at 68 where it is admixed with tempered hot water discharged from the mixing valve at outlet 18 for passage again through line 24.

An important feature of this operation is the pump assembly having the built-in aquastat responsive to line water temperature and having no external control. This insures that, especially during periods of standby or light usage of the tempered hot water, that water is automatically maintained so as to be available for instant use.

It will be observed that the aquastat 81 may be set at any desired temperature. For example in a commercial system where line 18 may be connected to a dishwasher operating at about 180° F. the switch 81 may be set for 180° F. closing and in such case the line 40 eliminated from the system.

In the invention the main portion of the recirculated water goes through the bypass line 40, only a small amount is returned to the heater tank, and a corresponding small amount of 180° F. water is drawn into the tempered hot water line 18 to maintain the desired temperature of the tempered hot water. The adjustment of the valve at 38 and 82 is individual to each system.

Referring to FIGURES 9, 10 and 11 a mixing fitting 90 of somewhat different valve structure than that of FIGURE 2 is connected to the tank 10. The fitting body has internal wall structure 91, 92 dividing it into hot water inlet 93, cold water inlet chamber 94 and mixing chamber 95.

Hot water from the tank 10 is introduced into the chamber 93 by a conduit leading through inlet opening 96 of FIGURE 10. The cold water inlet pipe connected to the lower end of the tank is shown at 97.

In this embodiment wall 91 is provided with spaced bores 98 and 99 leading to chambers 93 and 94 respectively and having wide shallow machined counterbores 101 and 102 respectively where they enter chamber 95 to provide sharp circular valve seat edges at 103 and 104.

Coaxial with bores 98 and 99 are outer wall bores 105 and 106 that are threaded to receive check valve assemblies 107 and 108 respectively.

These valve assemblies are preferably identical and each comprises a tubular body 109 threaded into bore 105 (or 106) and having a compressible gasket seal 111 with the body. Valve body 109 extends within mixing chamber 95 and there is internally threaded at 112 to receive the threaded inner end of a rotatable valve stem 113 which has a sealing O-ring connection with body 109 to terminate in a slotted head 114 to be turned by a screw driver or like tool.

Valve stem 113 has an internal cylindrical bore 115 opening into chamber 95 and slidably disposed in bore 115 is the shank 116 of a floating valve element 117 having a conical head surface 118 adapted to engage seat 103 (or 104) when in closed position as shown in FIGURE 10.

Each valve element 117 is biased toward its respective valve seat 103 or 104 by a coiled compression spring 119 within bore 115.

The effective valve opening at each bore 98, 99 may be selectively varied by adjustment of the corresponding valve stem 113 to locate the lower end of stem 113 as a stop to limit opening displacement of the associated valve element 117. This adjustment is made when the system is installed at the place of use because of the wide variations in water pressure and desired mixed water temperatures at each installation. Springs 119 are very light springs that have little or no effect on this adjustment, their essential function being to hold the valve seats 117 in closed position on bores 98, 99 with sufficient force to prevent gravity circulation in the system during standby periods.

Pressure of hot water within chamber 93 acts against the exposed area of valve element 118 in bore 98 and tends to open the valve to admit hot water into chamber 95, and the amount of hot water so admitted can be accurately controlled by adjustment of stem 113 to control valve opening.

Similarly cold water pressure in chamber 94 acts on the valve element 118 in bore 99 and urges it open to admit cold water into chamber 95, this inflow of cold water being also controlled by valve stem adjustment.

It will be noted that the threaded portion of each valve stem 113 is sufficiently long that the stem may be advanced to any selected stop position and even to engage valve element head 118 and tightly close either bore 98 or 99.

Thus each check valve 107 and 108 is capable of infinitely adjustment between positively closed and substantially fully open water flow conditions of bores 98 and 99 and the device may therefore be accurately set to attain any desired temperature of mixed tempered hot water within chamber 95. If desired each stem may have external calibration marks suiting known hot and cold water temperature and pressure conditions to deliver tempered water at a desired temperature at any of a different number of withdrawal rates. For example, in an existing installation of the type of FIGURE 10, starting with both valves closed, hot water at 180° F., cold water at 60° F. and at 45 pounds per square inch water pressure it was noted that with the cold water stem rotated 1½ turns (open) and the hot water stem rotated 3 turns (open) a flow rate of 8 gallons per minute at 140° F. from chamber 95 was obtained. By relatively varying the adjustment of either valve stem different flow rates at the same temperature of 140° F. may be obtained, or if desired a different tempered water temperature (120° F. for example) at different flow rates may be selected.

In FIGURE 9 the tempered water goes out to the various points of use along conduit 121 and a return line 122 is connected to the bottom of tank 10. Line 122 contains an electrically driven pump 123 containing a built-in aquastat that is effective at a suitable drop in temperature to pump water back into the tank for reheating and is essentially of the structure shown in FIGURE 8. Line 122 at its lower end contains flow control valve 82 having a bypass conduit 40 connection into opening 124 in FIGURE 10 whereby some of the returned tempered water from the system is introduced directly into chamber 95.

FIGURE 11 discloses the connections at valve 82 used in the systems of FIGURES 7 and 9. Valve 82 comprises a body 126 having a system connected inlet 127 and two outlets 128 and 129. Outlet 128 is an unrestricted bore connected to bypass line 40, and outlet 129 is a bore that contains rotatable valve plug 84 which is shown with passage 131 in partially open position.

At its outer end bore 129 is enlarged and enters the drain valve fitting 83 which has two outlets, one entering tank 10 directly and the other (not shown) being an external discharge drain controlled by handle 133.

Thus with the discharge drain closed, as is normally the case, return system water is proportioned between bypass 40 which discharges some of it into the mixing chamber 95 and passage 129 from which it directly re-enters the tank. When the system is to be drained, handle 133 is manipulated to open the drain valve 83 for direct external discharge.

An advantage of the system of FIGURES 9 and 10 is that this makes it possible to prevent gravity circulation of 180° F. water to fill chamber 95 and the entire supply line to the fixtures with 180° F. water. Undesired gravity circulation is prevented by the spring loaded check valves in fitting 90.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a hot water system wherein hot water is withdrawn from a tank through a supply conduit connected to at least one service outlet and cool water is introduced into the tank to replenish hot water withdrawn from the system through said outlet, means for maintaining the temperature of the water in said supply conduit at a predetermined level comprising a return conduit from said supply conduit to the tank, a pump assembly in one of said conduits, means responsive to the temperature of water in said supply conduit for starting operation of said pump assembly when said temperature drops below said predetermined level, means for continuously mixing direct hot water from said tank with a proportioned amount of said cool water to provide a continuous source of tempered hot water and for conducting said tempered hot water into said supply conduit, and proportioning means connected to said return conduit for diverting part of the returned water into admixture with said tempered hot water adjacent said mixing means while discharging the remainder of said returned water into said tank.

2. In the hot water system defined in claim 1, means for adjusting said proportioning means to vary the amount of said diverted returned water.

3. In a hot water system wherein hot water is withdrawn from a tank through a supply conduit connected to at least one service outlet, means for maintaining the temperature of the water in said supply conduit at a predetermined level comprising a return conduit from said supply conduit to the tank, a pump assembly in one of said conduits, means responsive to the temperature of water in said supply conduit for starting operation of said pump assembly when said temperature drops below said predetermined level, a mixing valve having a chamber wherein hot water from said tank is mixed with cool water to provide a continuous source of tempered hot water, an outlet from said chamber connected to said supply conduit through a fitting, and proportioning means connected to said return conduit for diverting part of the returned water into said supply conduit through said chamber while discharging the remainder into said tank.

4. In a hot water system wherein hot water is withdrawn from a tank through a supply conduit connected to at least one service outlet and cool water is introduced into the tank to replenish hot water withdrawn from the system through said outlet, means for maintaining the temperature of the water in said supply conduit at a predetermined level comprising a return conduit from said supply conduit to the tank, a pump assembly in one of said conduits, means responsive to the temperature of water in said supply conduit for starting operation of said pump assembly when said temperature drops below said predetermined level, a mixing valve having a chamber wherein direct hot water from said tank is mixed with said cool water to provide a continuous source of tempered hot water, an outlet from said chamber connected to said supply conduit, and proportioning means connected to said return conduit for diverting part of the returned water into said supply conduit adjacent said chamber outlet connection thereto while discharging the remainder into said tank.

References Cited in the file of this patent

UNITED STATES PATENTS

| | | |
|---|---|---|
| 1,780,379 | Durdin | Nov. 4, 1930 |
| 2,065,481 | Thulman | Dec. 22, 1936 |
| 2,517,233 | Peters | Aug. 1, 1950 |
| 2,604,265 | Thomas | July 22, 1952 |
| 2,669,187 | Guyer | Feb. 16, 1954 |
| 2,781,174 | Smith | Feb. 12, 1957 |
| 2,833,273 | Miller | May 6, 1958 |
| 2,884,197 | Whittell | Apr. 28, 1959 |
| 2,952,410 | MacKay | Sept. 13, 1960 |